Oct. 24, 1944.   J. JANDASEK   2,361,105

TRANSMISSION

Filed Sept. 21, 1942

INVENTOR
JOSEPH JANDASEK
BY A. E. Wilson
ATTORNEY

Patented Oct. 24, 1944

2,361,105

UNITED STATES PATENT OFFICE 2,361,105

TRANSMISSION

Joseph Jandasek, Detroit, Mich., assignor to Bendix Aviation Corporation, South Bend, Ind., a corporation of Delaware Application September 21, 1942, Serial No. 459,116

11 Claims. (Cl. 74—189.5)

This invention relates to transmissions, and more particularly to a multispeed mechanical transmission having a fluid transmission associated therewith.

An object of this invention is to provide a transmission having a plurality of mechanical gear speeds in the forward direction and a regenerative power-transmitting mechanism operable at low speeds.

A further object resides in the provision of a transmission having spaced driving and driven members operably interconnected by planetary gearing having driving connection with a fluid coupling to regenerate a portion of the applied power to be redirected to the driving shaft during low speed operations.

Yet a further object resides in the provision of a transmission having multistage selectively operable mechanical gear means interposed between driving and driven members whereby spaced mechanical gear means are operable to transmit power under certain conditions of operation.

A further object of this invention resides in the provision of a transmission having regenerative power-transmitting means susceptible of being rendered inoperative to provide for transmission of power through parallel paths.

Another object is to provide a regenerative power-transmitting mechanism susceptible of being transformed into a two-path power-flow device.

Another object is to provide a transmission having combined mechanical and fluid coupling means wherein the coupling may be rendered inoperative to provide for the transmission of power solely through the mechanical gearing at different speeds.

Yet a further object of this invention resides in the provision of a mechanical gear transmission having associated therewith a multistage regenerative fluid transmission for redirecting varying proportions of applied power back to the driving shaft.

A further object is to provide a mechanical gear transmission having a multispeed fluid power transmitting mechanism interposed between driving and driven shafts to regenerate varying proportions of power to the driving shaft dependent on variations of load and speed to which the driving and driven shafts are subjected.

Other objects and advantages of this invention will be apparent from the following detailed description considered in connection with the accompanying drawing, submitted for purposes of illustration only, and not intended to define the scope of the invention, reference being had for that purpose to the subjoined claims.

In the drawing wherein similar reference characters refer to similar parts throughout the several views.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation.

Figure 1:
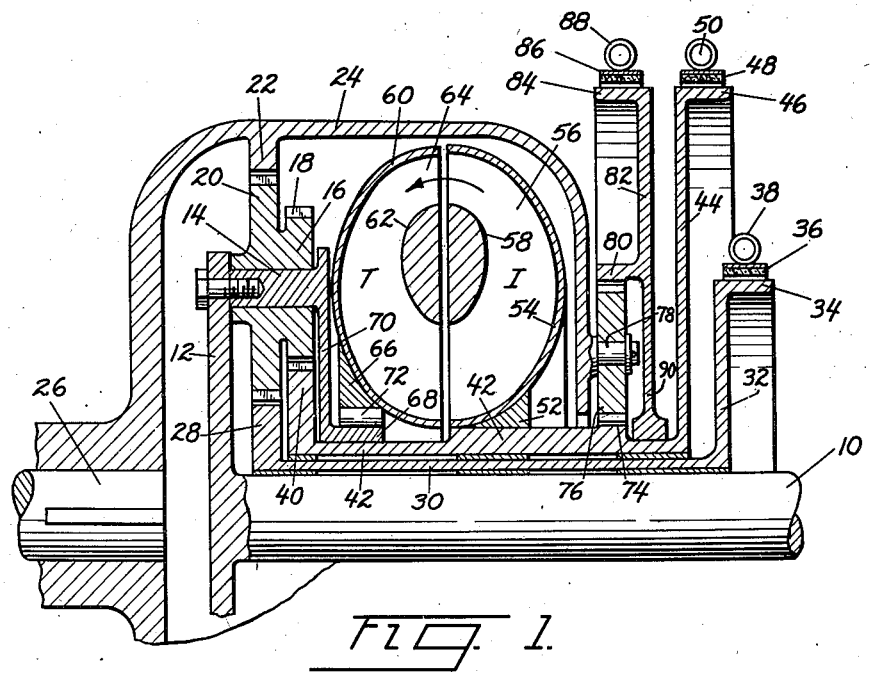
Fig. 1 is a longitudinal sectional view of a transmission embodying the present invention.

Referring now to the embodiment of the invention illustrated in Fig. 1, a driving shaft 10 has a flange 12 supporting spaced gear carriers 14 and gears 16 rotatably mounted on the carrier 14 have pinions 18 and 20.

The pinions 20 mesh with a ring gear 22 carried by a housing 24 fixed to a driven shaft 26 preferably aligned with the driving shaft 10. The pinions 20 mesh with a sun gear 28 on a sleeve 30 rotatable on the driving shaft 10 and terminating in a radially-extended flange 32 having an axially-extended drum 34 adapted to be engaged by a brake band 36 actuated by a brake applying means 38.

The pinions 18 mesh with a sun gear 40 carried by a sleeve 42 rotatable on the sleeve 30 and terminating in a flange 44 having a drum 46 adapted to be engaged by a brake band 48 actuated by a brake applying means 50.

The sleeve 42 has thereon a hub 52 having an impeller web 54 secured thereto. The impeller web 54 has thereon suitable vanes 56 supporting a shroud 58. A turbine web 60 and shroud 62 support suitable vanes 64, and the impeller and turbine cooperate with one another to provide a power transmitting fluid circuit.

The turbine web 60 is provided with a hub 66 concentrically disposed with relation to a sleeve 68 carried by a flange 70 fixed to the carrier 14. One-way driving means 72 is interposed between the turbine hub 66 and the sleeve 68 to transmit power from the turbine to the carrier 14 and its associated pinions when the speed of rotation of the turbine member overruns the speed of rotation of the carrier 14.

The sleeve 42 is provided with a sun gear 74 meshing with pinion 76 mounted on carriers 78 fixed to the housing 24. The pinions 76 mesh with a ring gear 80 on a flange 82 supporting a drum 84 adapted to be engaged by a brake band 86 actuated by a brake applying means 88. The flange 82 is provided with a hub 90 serving as a bearing for support of the flange 82.

The operation of this device is as follows: With the drums 34, 46, and 84 released to permit free rotation of their associated sun and ring gears, power applied by the driving shaft 10 rotates the carrier 14. A portion of the applied power is transmitted through the pinions 20 and ring gear 22 to exert a force tending to rotate the housing 24 and driven shaft 26. The remainder of the power is applied through the pinions 18 to rotate the sun gear 40. Rotation of the sun gear 40 results in transmission of power through the sleeve 42 to rotate the impeller web 54.

Rotation of the impeller results in fluid being energized and circulated to the turbine 64 to transmit power to the turbine web 60. Energy absorbed in the turbine is transmitted through the turbine hub 66 and one-way driving means 72 to the flange 70 thence to the carrier 14 supporting the pinions 18 and 20.

When the driven shaft 26 is subjected to a load greater than can be moved by the power exerted on the driving shaft 10 a relatively high proportion of the applied power is regenerated through the fluid coupling to be reexerted on the driving member. As the speed of rotation of the driven shaft 26 increases relative to the speed of rotation of the driving shaft 10, a progressively decreasing portion of power is regenerated and a progressively increasing portion of power is transmitted to the driven shaft 26 through the planet pinions 20 and the ring gear 22.

When the power applied by the driving shaft is sufficient to overcome the load to which the driven shaft is subjected and regeneration of power is unnecessary, the brake applying means 88 may be actuated to cause the brake band 86 to engage the drum 84 to lock the ring gear 80 against rotation. The pinions 76 then rotate within the ring gear 80 and power is transmitted to them through the pinions 18, sun gear 40, and sleeve 42. The pinions 76 being connected to the housing 24 through the carriers 78 transmit power to the driven shaft 26.

It will be noted that the gear ratio of the pinions 20 meshing with the ring gear 22 is substantially the same as the gear ratio of the pinion 76 driven by the sun gear 74 with the ring gear 80 locked against rotation. During this phase of the operation the impeller of the fluid coupling is rotated at a speed considerably higher than the speed of rotation of the carrier 14 fixed to the driving shaft 10, and the transmission of power from the turbine back to the carrier 14 is substantially nonoperative because the turbine overruns the speed of rotation of the driving shaft 10.

When it is desired to transmit power at an overdrive speed the brake applying means 50 may be actuated to move the brake band 48 into engagement with the drum 46 to lock the sleeve 42 and sun gear 40 against rotation. The fluid coupling is thus rendered inoperative by reason of the fact that the impeller is fixed to the sleeve 42 and power is thereby transmitted through the pinions 20 to the ring gear 22 carried by the housing 24 fixed to the driven shaft 26. The one-way driving means 72 permit free rotation of the sleeve 68 and the carrier 14. It will be noted that the pinions 18 of the gears 16 roll around the sun gear 40 now stationary.

If a still higher over-drive speed is desired, the brake applying means 88 may be actuated to cause the brake band 86 to engage the drum 84 to lock the sleeve 30 and sun gear 28 against rotation. The pinions 20 then roll around the sun gear 28 and transmit power through the ring gear 22 to the housing 24 and the driven shaft 26 at an over-drive speed.

Figure 2:
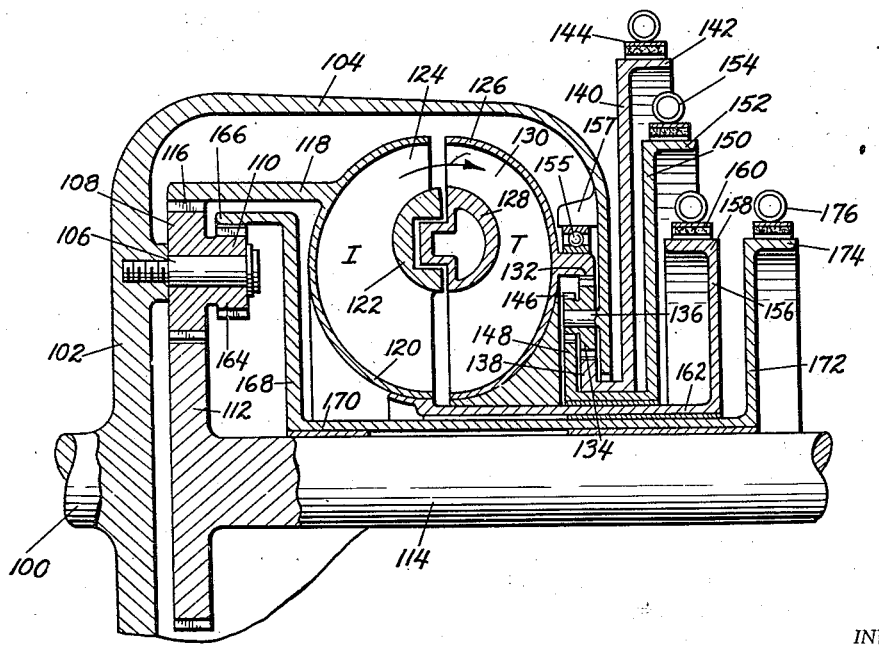
Fig. 2 is a longitudinal sectional view of a modified form of transmission.

Referring now to Fig. 2 a driving shaft 100 is provided with a radially extended flange 102 having an axially extended housing 104. The flange 102 is provided with spaced carriers 106 having spaced pinions 108 and 110 rotatably mounted thereon.

The pinions 108 mesh with a sun gear 112 fixed to a driven shaft 114, preferably coaxially aligned with the driving shaft 100. The pinions 108 mesh with a ring gear 116 carried by a flange 118 supporting an impeller web 120, and the impeller web 120 is connected to an impeller shroud 122 by suitable vanes 124.

A turbine comprising a web 126 and a shroud 128 separated by suitable vanes 130 cooperates with the impeller to provide a power-transmitting fluid circuit. The turbine web 126 is operably connected to the housing 104 by means of a ring gear 132 meshing with pinions 134 on carriers 136 fixed to the housing 104.

Speed-varying means are interposed between the turbine web 126 and the housing 104. One desirable form of speed-varying means comprises a sun gear 138 meshing with the pinions 134 and having a radially-extending flange 140 terminating in a drum 142 adapted to be engaged and locked by a braking mechanism 144.

A pinion 146 preferably of smaller diameter than the pinion 134 meshes with a sun gear 148 carried by a flange 150 terminating in a drum 152 controlled by a braking mechanism 154. A bearing 155 is interposed between the ring gear 132 and an abutment 157 carried by the housing 104 to insure proper concentric rotation of the turbine.

Speed-varying means may be interposed between the driving and driven shafts 100 and 114 respectively. One desirable form of such speed-varying means comprises a flange 156 having a drum 158 controlled by a brake mechanism 160. The flange 156 is fixed to a sleeve 162 secured to the impeller web 120 whereby the cylinder 118 and ring gear 116 may be locked against rotation to cause pinions 108 to roll within the ring gear 116 and transmit power to the sun gear 112 at an overdrive speed.

A speed-varying means comprises pinions 110 preferably of smaller diameter than the pinions 108. The pinions 110 mesh with the ring gear 166 carried by the flange 168 fixed to a sleeve 170 preferably interposed between the sleeve 162 and the driven shaft 114. The sleeve 170 terminates in a radially-extended flange 172 terminating in a drum 174 controlled by a braking mechanism 176.

The operation of this embodiment of the invention is as follows: Power applied to the driving shaft 100 is transmitted through the carriers 106 to the pinions 108 meshing with the sun gear 112 to transmit power to the driven shaft 114. The pinions 108 meshing with the ring gear 116 transmit a portion of the applied power through the cylinder 118 to rotate the impeller web 120.

Rotation of the impeller energizes the fluid, and power is absorbed from the energized fluid in the turbine. Energy is transmitted from the turbine through the ring gear 132, pinions 134, and carriers 136 to the housing 104 to be delivered to the carrier 106.

If the driven shaft 114 is subjected to a load greater than can be transmitted by the power applied to the driving shaft 100, a major portion of the applied power will be regenerated through fluid power transmitting mechanism to be reapplied to the driving members. As the speed of rotation of the driven shaft increases, a progressively decreasing proportion of the power is regenerated, and a progressively increasing proportion of power is transmitted through the pinions 108 and sun gear 112 to the driven shaft 114.

If multiplication of the regenerated torque ratio is desired, the brake mechanism 144 may be actuated to lock the sun gear 138 against rotation, thereby inducing the pinion gears 136 to rotate around the sun gear 138 and transmit power at an increased torque ratio to the housing 104 and the driving member 100.

When a still higher torque ratio of the regenerated power is desired, the brake mechanism 154 may be actuated to lock the sun gear 148 against rotation, whereupon the pinions 146 of smaller diameter than the pinions 134 roll about the locked sun gear 148 and cause power to be transmitted by the pinions 134 to the carriers 136 of the housing 104.

It will be noted that when the brake mechanisms 144 and 154 are released, the pinions 134 and 146 become inoperative due to the free rotation of the sun gears 138 and 148 respectively, whereupon the turbine is released, and no power will then be regenerated.

When overdrive speed is desired in the transmission of power from the driving shaft to the driven shaft the brake mechanism 160 may be actuated to lock the flange 156 and sleeve 162 and impeller with 120 against rotation. The ring gear 116 is therefore restrained from rotating, and power will be transmitted through the pinions 108 to the sun gear 112 and driven shaft 114 at an overdrive speed.

If still further overdrive speed is desired, the brake mechanism 176 may be actuated to lock the flange 172 and sleeve 170 against rotation, whereupon the flange 168 and ring gear 166 are held stationary. The pinion gears 110 being of smaller diameter than the pinion gears 108 roll within the ring gear 166 and transmit power to the sun gear 112 and driven shaft 114 at a still higher overdrive speed.

I claim:

1. In a transmission device, a driving shaft, a driven shaft, planetary gearing interposed between the driving and driven shafts, regenerative fluid power transmitting means driven by the planetary gearing, an auxiliary mechanical drive between the driving and driven shafts, and means to render inoperative the fluid power transmitting means and to render operative said auxiliary mechanical drive to provide two parallel paths of power flow between the driving and driven shafts after the fluid power transmitting means has been rendered inoperative.

2. A transmission comprising driving and driven shafts, planetary gearing interposed between the driving and driven shafts, a fluid transmission comprising an impeller driven by the planetary gearing, a turbine aligned with the impeller and cooperating therewith to provide a power-transmitting fluid circuit, one-way driving means between the turbine and the planetary gearing whereby a portion of the applied power may be redirected to be exerted on the planetary gearing, and braking means to lock the impeller against rotation to render the fluid transmission inoperative and to transmit power through the planetary gearing at a different speed ratio.

3. A transmission comprising a driving shaft having a radially-extended member, planet pinions carried by the radially-extended member, a driven shaft coaxially aligned with the driving shaft and having a housing surrounding the planetary gearing, a fluid transmission comprising cooperating impeller and turbine members juxtapositioned to provide a power-transmitting fluid circuit, driving means between the planetary gearing and the impeller, one-way driving means between the turbine and the planetary gearing whereby a portion of the applied power may be redirected to be exerted on the driving member, manually operable means to lock the impeller against rotation to render inoperative the fluid transmission and to transmit power through the planetary gearing at a changed speed ratio, a sun gear positioned to be engaged by the planetary gearing, and manually operable means to lock the sun gear against rotation to change the speed ratio of power transmission through the planetary gearing.

4. In a fluid and mechanical gear transmission, a driving shaft, planetary gearing operably connected to the driving shaft, impeller and turbine members cooperating to provide a power-transmitting fluid circuit, connecting means between the planetary gearing and impeller, one-way driving means between the turbine and the planetary gearing, a driven shaft, a housing enclosing the planetary gearing and fluid transmission, spaced power take-off means carried by the housing, and mechanical gear means associated with the planetary gearing and impeller driving means to transmit power from the driving member to the driven member.

5. In a transmission, a driving shaft, a driven shaft aligned with the driving shaft, planetary gearing interposed between the driving and driven shafts, cooperating impeller and turbine members mounted on the driving shaft and cooperating to provide a power-transmitting fluid circuit, driving means between the planetary gearing and impeller, gear means between the last-named driving means and the driven member, manually operable braking means to render said gear means inoperative to transmit power through the planetary gearing to the driven shaft at a different speed ratio, and one-way driving means between the turbine and the planetary gearing.

6. In a transmission, driving and driven shafts, planetary gearing between the driving and driven shafts, regenerative fluid power-transmitting means driven by the planetary gearing, torque multiplying means associated with the regenerative fluid power transmitting means to redirect multiplied torque to the driving shaft, and means to render said torque multiplying means inoperative.

7. A transmission comprising a driving shaft, planetary gearing operably connected to the driving shaft, a driven shaft aligned with the driving shaft, connecting means between the planetary gearing and the driven shaft, a fluid transmission comprising impeller and turbine members cooperating to provide a power-transmitting fluid circuit, connecting means between the planetary gearing and the impeller, and torque multiplying power-transmitting means between the turbine and the driving shaft whereby multiplied torque may be regenerated and exerted on the driving shaft.

8. A transmission comprising a driving shaft, a driven shaft aligned with the driving shaft, planetary gearing interposed between the driving and driven shafts, an impeller driven by the planetary gearing, a turbine aligned with the impeller and cooperating therewith to provide a power-transmitting fluid circuit, speed-increasing means between the turbine and the driving shaft whereby multiplied torque may be regenerated to the driving member.

9. A transmission comprising driving and driven members, planet pinions operably connected to the driving member, a sun gear operably connected to the driven member and positioned to be engaged by the planet pinions, a fluid transmission including impeller and turbine members cooperating to provide a power-transmitting fluid circuit, a ring gear positioned to be engaged by the planet pinions, connecting means between the ring gear and the impeller, torque multiplying mechanical gear means between the turbine and the driving member, and manually operable means to lock the impeller and ring gear against rotation to render inoperative the fluid transmission and to transmit power to the driven shaft at the different speed ratio.

10. In a transmission a driving shaft having a radially-extended member, a driven shaft having a sun gear, planetary gearing including pinions operably connected to said radially-extended member to engage the sun gear, a ring gear engaging the pinions, an impeller carried by the ring gear, a turbine aligned with the impeller and cooperating therewith to provide a power-transmitting fluid circuit, and speed-varying mechanical gear means between the turbine and the driving member whereby multiplied torque may be regenerated to the driving member.

11. A transmission comprising driving and driven members, planet pinions operably connected to the driving member, a sun gear operably connected to the driven member and positioned to be engaged by the planet pinions, a fluid transmission including impeller and turbine members cooperating to provide a power-transmitting fluid circuit, a ring gear positioned to be engaged by the planet pinions, connecting means between the ring gear and the impeller, and torque multiplying mechanical gear means between the turbine and the driving member.

JOSEPH JANDASEK.